United States Patent [19]

Bonanno

[11] Patent Number: 4,827,904
[45] Date of Patent: May 9, 1989

[54] APPARATUS FOR QUICK EMULSIFICATION AND HEATING OF LIQUIDS
[75] Inventor: Francesco Bonanno, Cosenza, Italy
[73] Assignee: Brevetti Gaggia S.p.A., Milan, Italy
[21] Appl. No.: 182,844
[22] Filed: Apr. 18, 1988
[30] Foreign Application Priority Data
Apr. 21, 1987 [IT] Italy ................... 8201 A/87
[51] Int. Cl.⁴ ............................................. A47J 27/06
[52] U.S. Cl. ...................................... 126/379; 99/293; 126/348
[58] Field of Search .................. 99/279, 293; 126/369, 126/379, 348

[56] References Cited
U.S. PATENT DOCUMENTS
4,557,187 12/1985 DePonti ........................... 126/379 X FOREIGN PATENT DOCUMENTS
1157750 3/1960 Fed. Rep. of Germany ...... 126/379
19670 of 1900 United Kingdom ................ 126/379

Primary Examiner—Edward G. Favors
Attorney, Agent, or Firm—Miller & Gibbons

[57] ABSTRACT

Apparatus apt to heat, emulsify, whip, harden, liquids of different types, particularly milk, chocolate, punch and the like, comprising:
a turbulence tube to be immersed in the liquid to be treated the wall of which is provided with a calibrated hole, being able to act as an air inlet; and
a securing block to be hermetically mounted on the top of said turbulence tube and terminating at its lower portion with a calibrated hole, said block being able to be coupled to a source of steam through coupling means.

7 Claims, 1 Drawing Sheet

APPARATUS FOR QUICK EMULSIFICATION AND HEATING OF LIQUIDS

This invention relates to a device, of small size, the purpose of which is to heat and emulsify any kind of liquid, without waste of energy.

This device is applied to the steam lances or jets of espresso coffee machines both of the professional type used in bars and of household type at the terminal portion of the steam lance or jet by means of suitable fittings, and it is especially useful to heat, emulsify, and thicken milk, chocolate, water as well as other liquids.

The device is hygienic in that there are no zones where the treated liquid may deposit itself; in addition it enables the operator to save precious time since this device requires less than 20 seconds to treat the selected liquid.

These and other features of this invention and the resulting advantages it affords will be clear from the following detailed description of one of its preferred embodiments, given only by way of not limiting example, taken in conjunction with the annexed drawings in which.

Figure 1:
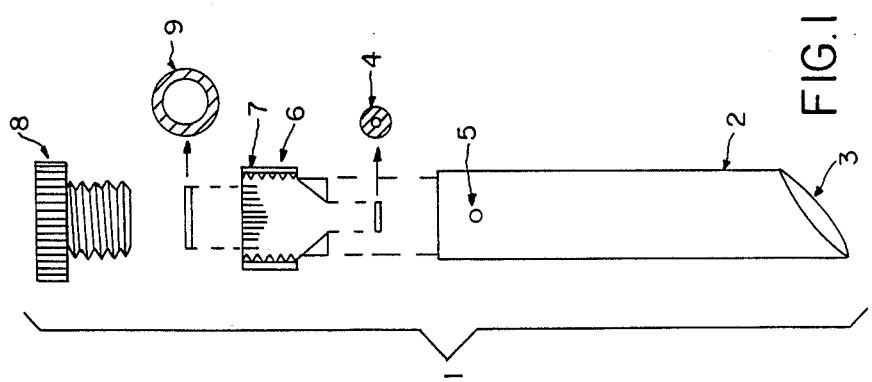
FIG. 1 is a explosion cross section view of a device according to this invention showing particularly its essential component parts.

With reference to the figures of the drawing, in particular and firstly to FIG. 1 as to the general construction features, a device 1 according to the invention comprises a tube 2, called "turbulence tube", of a suitable diameter and length, said tube being open at its lower part 3 which may be cut along a horizontal or inclined plane or yet in other ways. A small calibrated hole 5, for external air intake is provided in the upper portion of the turbulence tube 2 at the outlet of nozzle 4. Again at the top part of the turbulence tube a securing block 6 is located, the function of which is to direct the steam under pressure to the nozzle or, possibly toward a calibrated orifice. The top part of the securing block is provided with threads 7 the pitch of which corresponds to the pitch of the steam lance to which the device is to be connected.

By the application of assembly formed by a ring nut 8 and an ) ring 9, the same device can be utilized for household type machines having steam lances of a smaller diameter than the lances of professional machines.

Naturally, because of the simplicity of construction of this device, the securing block thread may have a pitch corresponding to the pitch of the household type coffee machine to which it is to be connected, or again the ring nut and the sealing O-ring can secure the device to the steam nozzles of professional type coffee machines. It is clear that the threading of the securing block may be either male or female.

The function of said securing blocks is also to support the turbulence tube and this lance may be compled by welding, threading, fitting on the block or it may be fabricated integral with the block.

Figure 2:
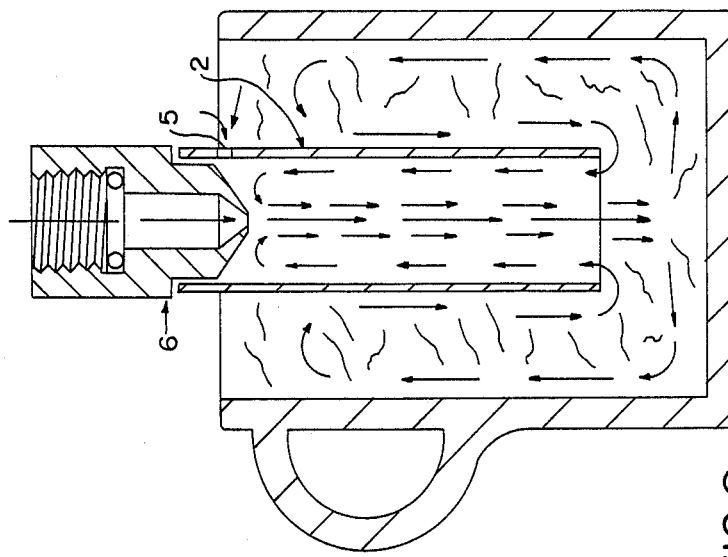
FIG. 2 shows a functional scheme of this device in operation.

FIG. 2 shows the operation of the device which may be described generally as follows:

By immersing the device into a liquid, for example, milk or another type of liquid, the liquid level inside turbulence tube 2, due to calibrated orifice 5, is equal to the external level of the liquid surrounding said tube. When the steam under pressure, in passing through nozzle 4, (see FIG. 1) urges the liquid downward, a vacuum is created which due to the fact that it cannot vent from the top part of the turbulence tube since this is plugged by the securing block 6, creates a turbulence such as to permit the liquid to rise along the turbulence tube, whilst at the central or inner part of the turbulence tube said liquid is forcefully expelled by the energy of the steam under pressure. Said forced turbulence occurring inside the turbulence tube does not allow the steam to escape in the form of bubbles, hence to disperse part of the heat, but compels the steam to rotate together with the liquid, yielding its heat to the liquid itself.

The entire procedure above described, aimed to heating only, is obtained by keeping immersed also the calibrated orifice, thereby creating a closed loop rotation of the steam and the liquid by virtue of the steam pressure, and through such rotation the steam yields all of its heat to the liquid to be heated.

Should it be desired, in addition to heating the liquid, also to emulsify, whip or harden it, depending on the type of liquid, the calibrated orifice should be maintained outside the level of the liquid to be treated, and in this way, by aspirating air from the exterior, this air, aspirated through the orifice, will be mixed with the liquid and the steam inside the turbulence tube, thereby causing an increase of the volume of the liquid, causing it to emulsify and/or harden.

Of course, the invention is not to be considered limited to the embodiment described only by way of example, but may be amply modified and varied, mainly as to construction details, and to render it suitable to meet particular requirements on specifications arising out of actual practice, without however departing from the wide scope and spirit of the invention as above described and as claimed hereinafter.

I claim:

1. Apparatus apt to heat, emulsify, whip, harden, liquids of different types, particularly milk, chocolate, punch and the like, comprising:
   a turbulence tube to be immersed in the liquid to be treated the wall of which is provided with a calibrated hole, being able to act as an air inlet; and
   a securing block to be hermetically mounted on the top of said turbulence tube and terminating at its lower portion with a calibrated hole, said block being able to be coupled to a source of steam through coupling means.

2. Apparatus according to claim 1, wherein the calibrated hole in the wall of said turbulence tube is approximately at the same level of the calibrated hole provided at the lower portion of said securing block, and preferably slightly higher than the level of the calibrated hole in the securing block.

3. Apparatus according to claim 1, wherein said coupling means comprises a ring nut and an O-ring, the steam lance being mounted on said ring nut, the O-ring being squeezed between the interior of the ring nut and the exterior of the end of the steam lance.

4. Apparatus according to claim 1, wherein said calibrated hole in the securing block is formed by a calibrated nozzle.

5. Apparatus as claimed in claim 1, wherein the lower end of said turbulence tube is slanted, plane or wave-shaped.

6. Apparatus as claimed in claim 1, wherein the coupling between the securing block and the steam lance is made by threading, welding or press fitting or they are integrally made.

7. Apparatus as claimed in claim 1, wherein the coupling between the trubulence tube and the securing block is made by welding, threading or press fitting.

* * * * *